March 28, 1944.  H. D. HOUGHTON  2,345,047

PROPELLER

Filed Aug. 25, 1939

INVENTOR
HOWARD DAVID HOUGHTON
BY HARRIS, KIECH, FOSTER & HARRIS

FOR THE FIRM
ATTORNEYS.

Patented Mar. 28, 1944

2,345,047

UNITED STATES PATENT OFFICE 2,345,047

PROPELLER

Howard David Houghton, West Los Angeles, Calif., assignor to Aviation Patents, Inc., Los Angeles, Calif., a corporation of California Application August 25, 1939, Serial No. 291,882

5 Claims. (Cl. 170—162)

My invention relates to propellers, with particular reference to controllable pitch aircraft propellers and is directed both to the structure per se of propellers and to methods of designing such propellers.

A controllable pitch propeller is mounted on a propeller shaft in a manner to permit a control mechanism to rotate the blade about a longitudinal blade axis radial to the axis of the shaft. Such axis may be termed the axis of pitch-changing rotation. When a blade of conventional design is stationary, the problem of changing pitch through some actuating mechanism is simple because the actuating force need be sufficient only to overcome the relatively small inertia and friction involved. Under dynamic operating conditions, however, the problem is complicated by two formidable factors, which may be conveniently termed the "centrifugal torque" and the "aerodynamic torque."

The centrifugal torque is the resultant tendency of centrifugal force acting on the various particles of the propeller material to twist the blade into the plane of blade revolution about the propeller shaft. The mass, mass distribution, and angular velocity of a typical airplane propeller are such that this over-all centrifugal torque about the blade axis commonly amounts to thousands of inch-pounds. For a given R. P. M. and pitch angle, the centrifugal torque is constant under all flight conditions.

The aerodynamic torque effective at normal pitch angles in the opposite direction about the axis of pitch-changing rotation is engendered by the thrust or air pressure on the blade surface, which air pressure may be considered as equivalent to a single resultant force acting on a single point of the blade surface termed the "aerodynamic center." This aerodynamic center may shift with pitch angle changes of the blade and with changes in the speed of advance of the propeller as a unit. For a given R. P. M. and air density, the magnitude of the aerodynamic torque will vary with flight speed, the maximum value being in most cases at a condition of standing or when the forward speed is zero, and the minimum value being at maximum speed flight.

While the aerodynamic torque is opposite to the centrifugal torque, the disparity between the magnitudes of the two torques in the normal operation of a propeller blade of the conventional type ordinarily results in a powerful net torque of the blade about the axis of pitch changing rotation. Since this resultant net torque is imposed on the pitch-control mechanism associated with the blade, that mechanism must be designed to function in an efficient and controlled manner whether counter to the torque or in the same direction as the torque, and must maintain a given adjustment regardless of the torque direction or magnitude.

Since at one instant it may be necessary in the employment of a variable pitch propeller of the conventional type to apply tremendous force through the control mechanism and shortly thereafter in changing pitch in the opposite direction to restrain the control mechanism under the driving force of the torque, it is apparent that the designing of a reliable and effective control mechanism involves serious difficulties, especially if the control mechanism is designed to function automatically as in an arrangement, for example, intended to maintain constant R. P. M.

To minimize such blade torque, various counter-balancing expedients have heretofore been employed in the art, including, for example, counterbalancing bodies or projections in radial disposition on the propeller blades. Such expedients, of course, increase the mass of the revolving assembly, as well as the air resistance to be overcome by the propeller.

In accordance with the present invention, the improved aeronautical propeller blade mounted for rotational change in pitch about a blade axis is characterized by a design of inherent balance in which at a selected flight condition the total centrifugal torques and the total aerodynamic torques of the blade are opposite and equal whereby the net torque of the blade about said axis is substantially zero. The words "inherent balance" as used in this specification are to be taken as meaning that the factors of balance are inherent in the blade itself. In other words, the over-all centrifugal torque that is balanced by the over-all dynamic torque is engendered within the confines of the blade configuration and is not attributable to counterbalance means or spring means extraneous to and apart from the blade itself.

The present invention also contemplates a method of mounting a variable-pitch propeller to minimize the range of magnitude of over-all torque of the propeller about its axis of pitch-changing rotation, the method being characterized by locating the axis about which the pitch changes are made within the confines of the blade throughout the major length of the blade, and locating the center of gravity of the blade toward the leading edge of the blade from the axis of pitch-changing rotation.

It is also within the purview of the present invention to provide a method of locating the axis of pitch-changing rotation axis of a variable-pitch propeller blade to minimize net blade torque under a selected flight condition, the method being characterized by plotting the integrated centrifugal torques and the integrated aerodynamic torques against displacement of the axis of pitch-changing rotation to arrive at two curves of substantially equal value at a common axis location.

The general object of my invention is to provide the desired degree of balance of a blade about the axis of pitch-changing rotation without resorting to a third torque derived from an added counterbalancing body or projection. More specifically, my object is to achieve inherent balance in a propeller blade, my invention being characterized by the conception of inherent balance, i. e., equalization of inherent centrifugal and aerodynamic torques of a propeller blade at a selected point within the normal range of operating conditions.

The term "normal," as applied to flight conditions, refers to climbing or to level flight, but not to diving, and by the expression "normal range of operating conditions" is meant the conditions between one extreme of take-off and the other extreme of top-flight speed at a constant altitude, standing and dive conditions being excluded. With respect to conditions within this normal range of operating conditions to either side of the selected point of equalization, it is the purpose of the invention to minimize the net torque of the propeller blade. For example, the blade may be designed to produce a net torque of zero at a selected flight condition with a tendency to turn in one direction at take-off and in the opposite direction at top-speed flight, the net torque at one extreme of the normal range of operating conditions being substantially equal to the net torque at the opposite extreme but being in an opposite direction. Thus, the torque required from, or to be resisted by, the control mechanism is minimized.

The present invention contemplates a departure from the present practice of disposing the axis of pitch-changing rotation of a blade along the line of centroids of the various sections of the blade. In the new design herein-shown, the axis of pitch-changing rotation is spaced from the line of centroids for at least a portion of the blade length. With nearly all airfoil sections used in propeller design, the offset of the axis of pitch-changing rotation with respect to the line of centroids of the sections will, in accordance with my invention, be toward the trailing edge of the blade, the offset being such that the desired balance mentioned above is obtained.

In the preferred embodiment of the invention, I do not contemplate designing each infinitesimal section of a blade, taken perpendicular to the axis of pitch-changing rotation, in such manner that centrifugal and aerodynamic torques thereon are equal. Such local equalization may be achieved at one or more sections of the involved blade but not in all sections. On the contrary, the preferred form of my invention is characterized by a predominance of centrifugal torque in one radial zone of the blade length and a predominance of aerodynamic torque in a second radial zone of the blade length, the net torques in the two zones being such as to equalize each other under a given flight condition in the normal range of operating conditions. For example, in an inner radial zone of the blade, the centrifugal torque may predominate, and in an outer radial zone the aerodynamic torque may predominate by an equal amount, so that, while the material of the blade between the zones is subjected to torque, the net torque of the blade effective against the control mechanism is substantially zero.

The more specific objects and advantages of my invention will best be understood from the more detailed explanation to follow.

Figure 1:
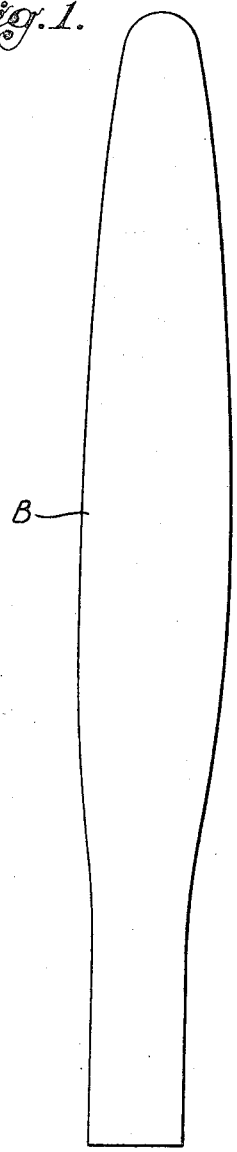
Figure 1 is a side elevation of a propeller blade designed in accordance with my invention.

Since the balance sought is necessarily with reference to a particular operating condition that supplies factors entering into the balance, it is necessary in arriving at an effective blade design to select that particular operating condition. More specifically stated, it is necessary to know the R. P. M. at which the blade is to be operated in a given service, and it is necessary to select the particular $$\frac{V}{ND}$$

value in the normal range of operating conditions at which balance is to be achieved before taking the steps of balancing a blade. In the well-known expression $$\frac{V}{ND}$$

V=air speed of the aircraft, N=number of revolutions per minute of the propeller, and D=diameter of the propeller.

For a given R. P. M. and blade pitch angle in a given blade with a given offset between the centroids of the blade sections and the axis of pitch-changing rotation, the centrifugal torque is fixed and may be carried as taught by my invention by changing the offset relationship. The aerodynamic torque of a given blade with a given axis of pitch-changing rotation and operating at a given R. P. M. varies with changes in the forward speed of the propeller, and, since the forward speed varies widely between the two extremes of the normal range of flight conditions, a substantial fluctuation in the blade torque against the control mechanism is inevitable.

In a conventional propeller operating at a given R. P. M., no counterbalancing means being provided, the centrifugal torque predominates over the aerodynamic torque by a margin of considerable magnitude at all times, that magnitude being effective against the pitch-control mechanism. Since the aerodynamic torque fluctuates, the net torque fluctuates accordingly, at zero speed the aerodynamic torque being at maximum value, and at top-flight speed, the other extreme condition of normal operation, the aerodynamic torque being at minimum value.

One of the objects of my invention is not only to reduce the magnitude of the resultant blade torque but also to reduce the range of variation of that magnitude under normal operating conditions. In this respect, my invention is characterized by the conception that, if the blade is designed for inherent balance at substantially a mean between the two extremes of take-off and top flight, the resultant blade torque will change in direction between take-off and top flight, but the range in magnitude of the torque will be only half as great as in a blade designed for continuous predominance of the centrifugal torque over the aerodynamic torque.

A further important feature of a blade designed in accordance with my conception is that, since most of the pitch changes are made under intermediate flight conditions, normally the blade torque effective when the pitch-control mechanism is actuated will be rather close to zero magnitude. In fact, if pitch changes in a given service occur predominately often under a given flight condition closer to one of the two extremes than the mean between the extremes, the propeller may be designed in accordance with my invention to have inherent balance of its torques under the given flight condition so that the majority of pitch changes will be made with substantially no blade torque present.

The effect of deciding where to locate the point of balance between the two torques may be illustrated by referring to a propeller that has been constructed in accordance with my invention. The aerodynamic torques of this blade have a normal range between a maximum value of approximately 735 inch-pounds at take-off and a minimum value of approximately 255 inch-pounds at top-flight speed, a range in magnitude of approximately 480 inch-pounds. It is apparent that, if such a blade at the given R. P. M. has a centrifugal torque outside this range (either below 255 inch-pounds or above 735 inch-pounds), the blade torque against the pitch-control mechanism under normal flight conditions will always have some value in excess of 480 inch-pounds, and will fluctuate over a range of 480 inch-pounds. Thus if the centrifugal torque is 200 inch-pounds, the net blade torque will fluctuate between a minimum of 55 inch-pounds and a maximum of 535 inch-pounds, the range of fluctuation being 480 inch-pounds. If, however, the blade has a centrifugal torque of 495 inch-pounds, the mean value of the extreme aerodynamic torques, the torque acting against the pitch-control mechanism will change in direction between take-off and top-flight speed, but it is important to note the maximum magnitude of the blade torque will be only 240 inch-pounds, which figure also represents the range over which the blade torque may fluctuate. Since most of the pitch changes will be made when the aerodynamic torque is nearer to the mean than to either of the extremes, the normal blade torque will be closer to zero than to the maximum value of 240 inch-pounds. If it is contemplated that, in a particular service, the majority of pitch changes are to be made at a normal cruising speed when the aerodynamic torque has some value other than the mean aerodynamic torque, the blade may be designed for a centrifugal torque of precisely the cruising magnitude so that, in the majority of instances, substantially no blade torque will be effective when the pitch-changing mechanism is actuated.

In practicing my invention, after selecting the operating conditions for the balancing of torques, I find it convenient next to determine the airfoil section to be used in the design. New sections may be developed, if desired, though the invention can well be applied to all airfoil sections now in use. In my preferred practice, substantial progress is made initially toward the goal of torque equalization in the very act of selecting the basic blade section. The possibilities in this step may be understood when it is considered that, since the centrifugal torque ordinarily exceeds the aerodynamic torque by a wide margin in conventional propeller blades, reduction of the margin may be favored by seeking a basic design providing inherently either a relatively high aerodynamic torque or a relatively low centrifugal torque. Since the magnitude of a torque varies with the length of its torque arm, the aerodynamic torque may be favored by selecting a blade section characterized by a center of pressure well forward to provide a relatively long torque arm with respect to the axis of pitch-changing rotation. As for the other torque, it is helpful to consider than one of the factors determining the centrifugal torque involves the difference of moments of inertia in the cross-sectional pattern of the blade and, accordingly, I prefer to select as thick a section as is consistent with good design.

Certain other considerations may also enter into the selection of a basic blade section. For example, since the centrifugal torque is constant for a given R. P. M. and blade angle, it is desirable to restrict variation of the aerodynamic torque to whatever extent is feasible by selecting a blade providing favorable shift in its center of pressure under changing operating conditions. By way of example, an airfoil that may be advantageously used is one of the 23,000 series published by the National Advisory Committee for Aeronautics. This design, which has rarely, if ever, been used heretofore as a blade element, lends itself advantageously to my purpose with special reference to the foregoing considerations. This section is good to high Reynolds numbers encountered in propeller design, has its center of pressure well forward, namely, at 23.4% of the section chord from the leading edge, and is characterized by small travel of the center of pressure. The term "relatively thick" employed in certain of the claims is intended to define a blade having a ratio of thickness to chord at least as large as that ratio in the 23,000 series referred to above.

Having selected a basic blade, or at least a basic airfoil section for a blade, and having selected a particular point in the normal range of operating conditions, I may adopt any one of a number of procedures to arrive at a successful blade design. The procedures may be either paper methods based entirely on calculations, or may be empirical methods involving the manipulation of actual blades. By choice, I resort to paper methods as will now be discussed.

With respect to the paper methods, my invention is characterized by the conception that a given blade may be considered as divided into any number of cross-sectional slices of definite thickness, the centrifugal and aerodynamic torques of which may be integrated. For example, cross-sectional slices of one inch thickness may be taken at stations at selected intervals along the length of a given blade and the centrifugal torques and aerodynamic torques of each slice separately calculated. The two torques of the series of slices are then platted against propeller radius to produce two curves representing integrations of centrifugal and aerodynamic values. The test for balance is whether or not the areas circumscribed by the curves are equal, since a condition of balance exists when the integrated centrifugal torques equal the integrated aerodynamic torques of the blade.

One procedure on paper may begin with the selection of an arbitrary relationship between the axis of pitch-changing rotation and the various cross-sectional slices and the ascertainment of the relative magnitude of the resulting net torques by the graphic procedure described above. The predominance of one of the torques over the other discovered by the graph will indicate the direction in which the relationship between the axis of pitch-changing rotation and the centroids of the cross-sectional slices should be shifted to approach a balanced condition. A new relationship for the axis of pitch-changing rotation is selected accordingly and a corresponding pair of torque curves derived to discover the effect of the shift. This cut-and-try method on paper is repeated until a relationship between the axis of pitch-changing rotation and the centroids of the cross-sectional slices is found that produces the required equalization of the two torque curves.

In my preferred procedure, however, I plot the integrated values of the two torque curves against displacement of the axis of pitch-changing rotation with respect to some arbitrary reference position. In other words, I plot the changes in the areas described by the two torque curves as the axis of pitch-changing rotation is shifted. Since I am interested solely in magnitudes, I may consider both the curves of integrated values as positive so that the intersection of the two curves of integrated values will indicate the location of the axis of pitch-changing rotation at which the two torques will be equalized under the selected operating conditions. In other words, I propose to calculate the effect of progressively changing the blade beginning with a blade in which predominance of one torque is inherent and gradually shifting the design until the opposite torque predominates under the given operating conditions and thus discover a transition point at which the aerodynamic and centrifugal torques substantially balance.

Figure 2:
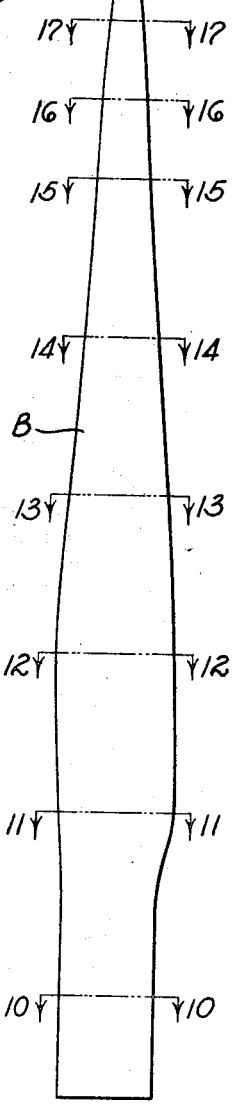
Figure 2 is a second side elevation of the blade taken at a 90° angle from the first elevation.
Figure 3:
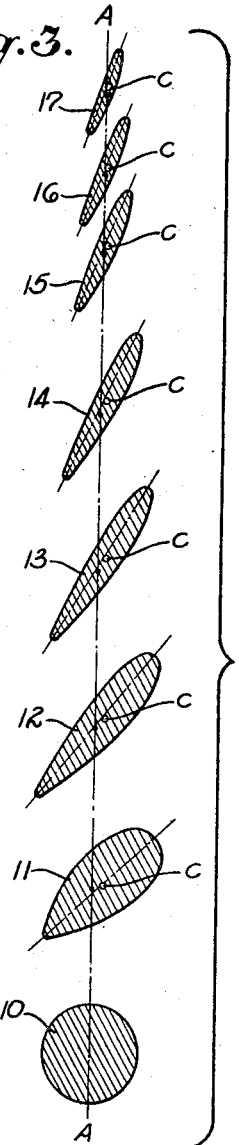
Figure 3 is a schematic view showing eight typical sections of the blade in relation to the blade axis of pitch-changing rotation, these sections being taken along corresponding numbered lines of Figure 2.

In the practice of my preferred procedure, I proceed by laying out sections of the propeller at various positions spaced preferably at 5% intervals along the length of the blade, each section representing a slice of, say, one inch thickness. Since the hub may take up nearly 20% of the propeller radius and since at least 10% of the propeller at the tip contributes little to either of the torques under consideration, attention may be confined primarily to the portions of the blade lying between 20% and 90% of the propeller radius. The extent of the blade lying between these points of the propeller radius may be defined as the "effective" length of the propeller. In the drawing, I indicate in Figures 1 and 2 the configuration of a balanced propeller blade B designed in accordance with the preferred practice of my invention. In Figure 3, from which several of the positions are omitted for clarity, the circular section 10 is taken at the shank of the blade along the line 10—10 and the remaining sections 11 to 17 represent random positions of the series taken at lines shown in Figures 1 and 2, with numerals corresponding to the sections. Each section is shown with a line representing its chord and has its centroid indicated by the letter C. A line A—A represents the axis about which the blade is to be rotated in changing from one pitch to another.

For a given series of cross-sectional slices, the character of the curves of integrated torque values will be affected by the manner in which the relationship between the axis of pitch-changing rotation and the centroids of the sections is changed in the progressive offsetting of the axis of pitch-changing rotation, and also will be affected by the selection of the line across each section along which the offset relationship is to be varied.

In other words, it is proposed to calculate the effect of progressively changing the blade beginning with a blade in which predominance of one moment is inherent and gradually shifting the design until the opposite moment predominates under the given operating conditions and thus discover a transition point at which the aerodynamic and centrifugal moments substantially balance.

In my preferred procedure, for each position of the axis of pitch-changing rotation against which the values of the integrated torques are plotted, I consider each of the various cross-sectional slices of the blade as disposed to place the axis of pitch-changing rotation a given percentage of the chord of the cross-sectional slice from the leading edge of the blade, the same percentage being applied to each cross-sectional slice throughout the blade. Thus, for example, at one end of the chart showing the integrated torque values, the relative magnitudes of the integrated torques may be shown for a blade in which the axis of pitch-changing rotation passes through each of the cross-sectional slices at a point approximately 35% of the section chord from the leading edge of the blade, and at the other end of the chart, the relative magnitudes of the integrated torques may be shown for an arrangement in which the axis of pitch-changing rotation intersects each section slice at a point spaced from the leading edge of the blade by approximately 65% of each section chord.

In my preferred procedure, I consider the shift in relationship between the various section slices and the axis of pitch-changing rotation as being made across each section along or adjacent its axis of least moments of inertia passing through the centroid of the section, but it is to be understood that the shift may be made along other lines, for example, lines parallel to the section chords or parallel to the line of least moments through each section. If the basic airfoil section selected at the outset lends itself to inherent balancing as conceived in my invention, the two curves of the integrated torques will intersect somewhere in this range of positions between 35% and 65% of the various chord sections.

While, theoretically, various procedures on paper may be followed to arrive at a balanced blade, it may be stated, in general, that many of the possible procedures would arrive at equalization by distorting the blade to an impractical degree, producing shapes structurally out of the question. It will be apparent that progressively shifting the various section slices by percentage distances, as described in my preferred procedure, will result in progressive change in the blade configuration, but with a suitable basic airfoil section, the change in configuration will be moderate and within structurally feasible limits.

In one procedure, progressive change in the configuration of a basic blade design is entirely eliminated by keeping the various blade sections in fixed relationships to each other. In other words, I shift the axis of pitch-changing rotation to various positions in a blade of fixed configuration. In another procedure for arriving at a balanced blade, I ascertain the effect of progressively bending the blade near the hub.

In another procedure, I start with considering the axis of pitch-changing rotation as extending through the centroids of the sections throughout the blade and ascertain the effect of bending an end portion of the blade through a progressively increasing angle.

A feature of the preferred practice of my invention in which the various slices are considered as shifted by percentage distances is that it represents a compromise between the desirability of minimizing the change in blade configuration and the desirability of minimizing the extent and complexity of calculation required. The shifting of the sections by percentage distances causes the integrated value of the aerodynamic torques to describe a straight line having zero value where the center of pressure of the blade is at the axis of pitch changing rotation, so that it is necessary to calculate only one integrated value to fix the aerodynamic curve. The curve of integrated centrifugal torques will have a desirable degree of regularity or symmetry so that the location of relatively few points will reveal the general character of the curve and indicate the probable region of torque equalization.

In the various blade sections shown in Figure 3, the axis of pitch-changing rotation is approximately on the line of least moments. The preferred procedure on paper by means of which I arrive at the blade configuration of Figures 1, 2, and 3 may be further understood by reference to Figure 4.

Figure 4:
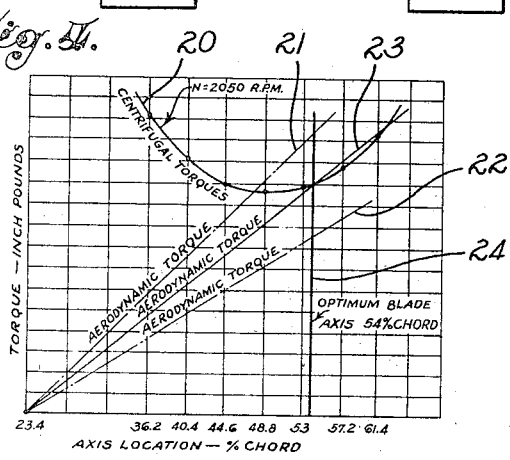
Figure 4 is a graphic representation of the values involved in a typical practice of my invention.

In Figure 4, the integrated centrifugal torques and the integrated aerodynamic torques are plotted for various shifts in the blade sections with respect to the axis of pitch-changing rotation. Thus, the integrated values at 36.2 are those based on the blade configuration in which the axis of pitch-changing rotation of the blade passes through a point of each blade section that is 36.2% of the particular section chord from the leading edge of the section. A sufficient number of shifts of the blade sections are taken to permit plotting the curve 20 representing integrated centrifugal torques in the range between a location of the axis of pitch-changing rotation at approximately 35% of each blade section and a location of the axis of pitch-changing rotation at approximately 65% of each blade section. The curve 20 represents a given value of N throughout, say 2050 R. P. M. as the constant speed contemplated for the given propeller under consideration. It will be noted that the minimum value of the integrated centrifugal torques in this particular curve is found when the axis of pitch-changing rotation of the blade is at approximately the 48.8% point of each blade section.

In the particular basic blade configuration assumed in Figure 4, the integrated aerodynamic torques for various values of $$\frac{V}{ND}$$

plotted against shifts in the pitch axis form a pencil of straight lines radiating from zero value at a location of the axis of pitch-changing rotation of 23.4% (aerodynamic center) of each blade section. Line 21 of Figure 4 taken at $$\frac{V}{ND}=0$$

represents the value of the integrated aerodynamic torques at take-off, and line 22 taken at $$\frac{V}{ND}=1.0$$

for example, represents the value of the integrated aerodynamic torques at top-flight speed. The two lines 21 and 22, then, bound the normal range of operating conditions. Electing to design the blade for balance at a mean value of $$\frac{V}{ND}$$

I plot the line 23 representing the mean between lines 21 and 22 and arrive at a location for the axis of pitch-changing rotation determined by the intersection of line 23 with the line 20.

In Figure 4, there are two intersection points, one with the axis of pitch-changing rotation located at the 54% point of each blade section and one with the axis of pitch-changing rotation located at the 63% point of each blade section. For structural reasons, I choose the location for the axis of pitch-changing rotation that is nearest to the center of gravity of the blade. Supposing, for example, that the axis of pitch-changing rotation of the blade passes through the center of gravity of the blade when the axis of pitch-changing rotation is at the 44.6% point of each blade section, I elect the blade configuration in which the pitch axis passes through the 54% point rather than the 63% point of each blade section, the resultant blade configuration being shown in Figures 1 to 3.

In Figure 4, the line 24 represents the blade configuration in which the axis of pitch-changing rotation is located at the 54% point of each blade section. Vertical distances on this line represent net blade torque, zero net torque being represented by the intersection of line 24 with the intermediate aerodynamic line 23. In the range of normal operating conditions, the maximum net torque about the axis of pitch-changing rotation in one direction that is imposed upon the pitch-control mechanism is represented by the vertical distance on line 24 between lines 21 and 23, and the maximum net torque in the opposite direction imposed on the pitch-control mechanism is measured by the distance on line 24 between lines 22 and 23.

Figure 5:
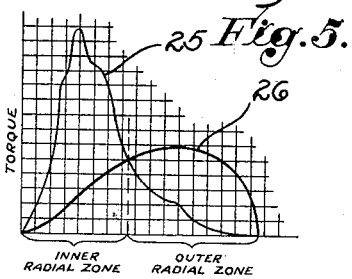
Figure 5 is a graphic representation of torque distribution in a typical blade designed in accordance with my invention.

Figure 5 shows graphically how the two torques are distributed along the effective length of a typical blade designed in accordance with my invention, the values being plotted against distance from the hub axis of the propeller assembly. It will be noted that the maximum centrifugal torque is in the inner radial zone, the centrifugal torques predominating in that zone, while the maximum aerodynamic torque is in the outer radial zone in which zone the aerodynamic torques predominate. Figure 5 is based on the selected operating condition at which balance is sought, i. e., a given $$\frac{V}{ND}$$

value is assumed, and that such balance is achieved is revealed by the fact that the area defined by the curve 25 representing centrifugal torques is substantially equal to the area defined by the curve 26 representing aerodynamic torques.

As previously suggested, a number of such charts as shown in Figure 5 may be developed in a cut-and-try method of designing a blade on paper, each chart representing a different distribution of the blade mass relative to the axis of pitch-changing rotation. The procedure exemplified by Figure 4, however, leads directly to the required combination of blade configuration and location of the axis of pitch-changing rotation.

In the empirical methods heretofore mentioned, concrete experimental blades are arranged for experimental shift of the torques. For example, a metal experimental blade may be actually bent progressively with frequent tests to ascertain the effect of the bending on the torques. As another example, an experimental blade may be mounted on a propeller hub in a manner to permit bodily shifting of the blade laterally with respect to the axis of the hub so that the blade may be tested in various shifted positions.

To test an experimental blade for the relative magnitudes of the two torques to be balanced, the tendency of the blade with a given location of axis of pitch-changing rotation to rotate may be measured under actual operating conditions by simply noting whether or not the blade exerts any appreciable torque on the pitch-control mechanism in actual flight at the R. P. M. and rate of forward speed at which equalization is desired.

In another test procedure for an experimental blade, the aerodynamic torque of the blade may be calculated for the selected flight condition, and then the blade may be operated on the ground at the desired R. P. M. to ascertain the torque of the blade under static conditions, i. e., without forward progress of the blade. Since the over-all aerodynamic torque of the blade under static condition when the $$\frac{V}{ND}$$

value is zero may be readily calculated, the centrifugal torque at the selected R. P. M. may be derived from the net torque at that R. P. M., and the blade may be shifted with respect to its axis of pitch-changing rotation in an experimental procedure until a disposition of the blade is found at which the net torque indicative of the desired centrifugal torque is developed.

Whether the balancing of the blade is achieved by calculations on paper or by one of the empirical methods, the end result is the same, the centrifugal torque predominating in an inner radial zone of the propeller, say, between 20% and 40% of the propeller radius, and the aerodynamic torque predominating by an equal amount toward the propeller tip from that zone when the blade is operated under the selected flight condition. With extremely rare exceptions, whatever basic airfoil section is selected, it will be characteristic of the final configuration of the blade that the center of gravity of the blade will lie between the aerodynamic center and the axis of pitch-changing rotation, or conversely stated, it will be characteristic of the balanced blade that the axis of pitch-changing rotation will lie toward the trailing edge of the blade from its center of gravity.

The foregoing description will suggest to those skilled in the art various modifications and departures within the scope of my inventive concept, and I specifically reserve the right to all such modifications and departures that are covered by my appended claims.

I claim as my invention:

1. An aeronautical propeller blade adapted for rotational attachment to a hub to turn about an axis of pitch-changing rotation in response to positively-applied control forces and which blade is inherently balanced to minimize the control forces necessary to effect changes in pitch, said blade being characterized by a design in which the blade is relatively thick, in which the axis of pitch-changing rotation of the blade lies within the confines of the blade throughout the major portion of the length of the blade, in each cross section of which major portion the centroid is spaced toward the leading edge of the blade from said axis, and in each cross section of which major portion the aerodynamic center of the blade is closer to the leading edge of the blade than is the centroid, said aerodynamic center and said centroid being so spaced from said axis that under a selected flight condition and when the pitch angle is at or near the average of the pitch angles at which pitch-changing is effected the centrifugal torque about said axis tending to decrease the blade pitch and the aerodynamic torque about said axis tending to increase the blade pitch substantially balance each other with respect to torque factors within the confines of the blade configuration.

2. An aeronautical propeller blade adapted for rotational attachment to a hub to turn about an axis of pitch-changing rotation in response to positively-applied control forces and which blade is inherently balanced to minimize the control forces necessary to effect changes in pitch, said blade being characterized by an airfoil section having a center of pressure well forward toward the leading edge and in which the center of pressure shifts no more than a small amount with change in propeller-blade pitch, said blade being characterized also by a design in which the blade is relatively thick, in which the axis of pitch-changing rotation of the blade lies within the confines of the blade throughout the major portion of the length of the blade, and in each cross section of which major portion the centroid is spaced toward the leading edge of the blade from said axis, the aerodynamic center of each such cross section of the blade being closer to the leading edge than said centroid of each such cross section so that under a selected flight condition and when the pitch angle is intermediate the two extremes of pitch angle at take-off and top flight the centrifugal torque about said axis tending to decrease the blade pitch and the aerodynamic torque about said axis tending to increase the blade pitch substantially balance each other.

3. An aeronautical propeller blade adapted for rotational attachment to a hub to turn about an axis of pitch-changing rotation in response to positively-applied control forces and which blade is inherently balanced to minimize the control forces necessary to effect changes in pitch, said blade being characterized by an airfoil section having a center of pressure well forward toward the leading edge and in which the center of pressure shifts no more than a small amount with change in propeller-blade pitch, said blade being characterized also by a design in which the axis of pitch-changing rotation of the blade lies centrally of the blade throughout the major portion of the length of the blade, and in each cross section of which major portion the centroid is spaced toward the leading edge of the blade from said axis, the aerodynamic center of each such cross section of the blade being closer to the leading edge of the blade than said centroid of each such cross section so that under a selected flight condition and when the pitch angle is intermediate the two extremes of pitch angle at take-off and top flight the centrifugal torque about said axis tending to decrease the blade pitch and the aerodynamic torque about said axis tending to increase the blade pitch substantially balance each other.

4. A propeller blade as defined in claim 3, in which said axis of pitch-changing rotation passes through each of such cross sections of the major portion of said blade length at a point near the axis of least moments of inertia of such section passing through the centroid of such section.

5. A propeller blade as defined in claim 3, in which at each such cross section of the major portion of the blade length the axis of pitch-changing rotation is spaced from the leading edge of such section by a proportion of section chord that is substantially the same throughout such major portion of the blade length.

HOWARD DAVID HOUGHTON

CERTIFICATE OF CORRECTION.

Patent No. 2,345,047. March 28, 1944.

HOWARD DAVID HOUGHTON.

It is hereby certified that error appears in the printed specification of the above numbered patent requiring correction as follows: Page 2, first column, line 5, after "rotation" strike out "axis"; line 51, for "controids" read --centroids--; and second column, line 22, before "axis" strike out "blade"; line 57, for "carried" read --varied--; page 3, second column, line 27, for "than" read --that--; page 4, first column, line 3, for "platted" read --plotted--; and that the said Letters Patent should be read with this correction therein that the same may conform to the record of the case in the Patent Office.

Signed and sealed this 30th day of May, A. D. 1944.

Leslie Frazer

(Seal) Acting Commissioner of Patents.